United States Patent

Kanazawa et al.

[11] Patent Number: 5,898,805
[45] Date of Patent: Apr. 27, 1999

[54] LIGHT TRANSMISSION DEVICE USING OPTICAL FIBER

[75] Inventors: Hiroshi Kanazawa; Tadashi Minakuchi; Masahiro Oono; Mitsunori Iima, all of Tokyo, Japan

[73] Assignee: Asahi Kogaku Kogyo Kabushiki Kaisha, Tokyo, Japan

[21] Appl. No.: 08/791,979

[22] Filed: Jan. 31, 1997

[30] Foreign Application Priority Data

Jan. 31, 1996 [JP] Japan ................................ 8-037267

[51] Int. Cl.⁶ ............................................ G02B 6/26
[52] U.S. Cl. ...................................... 385/38; 359/209
[58] Field of Search ............................... 385/31, 38, 39, 385/147; 451/1, 5, 11, 27, 42, 211, 256; 347/137; 355/67, 71, 66; 359/210, 196, 216, 209

[56] References Cited

U.S. PATENT DOCUMENTS

| | | | |
|---|---|---|---|
| 4,577,926 | 3/1986 | Dewey et al. | 385/117 |
| 5,127,072 | 6/1992 | Blauvelt et al. | 385/88 |
| 5,305,335 | 4/1994 | Ball et al. | 372/6 |
| 5,631,987 | 5/1997 | Lasky et al. | 385/88 |

FOREIGN PATENT DOCUMENTS

| | | |
|---|---|---|
| 61-59412 | 3/1986 | Japan . |
| 62-269902 | 11/1987 | Japan . |
| 2-198413 | 8/1990 | Japan . |
| 2-240617 | 9/1990 | Japan . |
| 2-140510 | 11/1990 | Japan . |

OTHER PUBLICATIONS

An English Language Translation of Japanese Provisional Patent Publication 61–59412, published Mar. 26, 1986.
An English Language Translation of Japanese Provisional Patent Publication 62–269902, published Nov. 24, 1987.

*Primary Examiner*—Akm E. Ullah
*Attorney, Agent, or Firm*—Greenblum & Bernstein, P.L.C.

[57] ABSTRACT

A light transmission device includes a semiconductor laser for emitting a laser flux, an optical fiber for transmitting the laser flux emitted from the semiconductor laser, and a device that prevents the laser flux, reflected at an incident end surface of the optical fiber, from returning to the semiconductor laser. In particular, the preventing device may be a slanted incident end surface of the optical fiber, such that the reflected laser flux at the incident end surface is directed away from the semiconductor laser. The preventing device may also be an optical isolator that is disposed between the semiconductor laser and the incident end surface of the optical fiber.

13 Claims, 10 Drawing Sheets

LIGHT TRANSMISSION DEVICE USING OPTICAL FIBER

BACKGROUND OF THE INVENTION

The present invention relates to a light transmission device that transmits a light flux via an optical fiber. In particular, the present invention relates to a light transmission device in which reflected light does not return to a light emitting element.

In a particular example, a multi-beam scanning optical device is provided with a light transmission device that includes a plurality of semiconductor lasers and a plurality of optical fibers. Light fluxes emitted from the semiconductor lasers enter into respective optical fibers, and are transmitted from exit ends of the optical fibers. The light fluxes exiting from the optical fibers are deflected by a polygon mirror and converged on an image surface through a scanning lens to form a plurality of scanning lines per scan.

However, in a conventional system, a part of a light flux emitted from a semiconductor laser may return back to an semiconductor laser due to reflection by the incident end surface of the optical fiber, causing the oscillation of the semiconductor laser to be unstable.

In particular, the oscillation mode of the semiconductor laser may change from a mono-mode to a multi-mode or the width of the oscillation wavelength may widen. Since a scanning optical system is generally not corrected for chromatic aberrations due to the generally limited wavelength of the semiconductor laser emissions, a change of the oscillation wavelength may result in a loss of the desired diameter of the beam spot on the image surface due to longitudinal chromatic aberration and may result in a change in the length of the scanning line due to lateral chromatic aberration. Variations in the diameter of the beam spot and the length of the scanning line decrease the accuracy of the image formed by the scanning lines, particularly at high resolutions.

SUMMARY OF THE INVENTION

It is therefore an object of the present invention to provide a light transmission device using an optical fiber in which variations in the oscillation of the semiconductor laser caused by light flux returning to the semiconductor laser are prevented.

According to an aspect of the present invention, a light transmission device includes a semiconductor laser that emits a laser flux, an optical fiber that transmits the laser flux emitted from the semiconductor laser, and means for preventing the laser flux, reflected at an incident end surface of the optical fiber, from returning to the semiconductor laser.

In particular, the preventing means may comprise a slanted incident end surface of the optical fiber, such that the reflected laser flux at the incident end surface is directed away from the semiconductor laser. The preventing means may also comprise an optical isolator that is disposed between the semiconductor laser and the incident end surface of the optical fiber.

In addition to the preventing means at the incident end surface of the optical fiber, the exit end surface of the optical fiber may be formed at an angle such that the normal of the exit end surface and a center axis of the optical fiber are inclined with respect to each other by a predetermined angle so that the reflected laser flux at the exit end surface does not satisfy the total reflection condition of the optical fiber.

DETAILED DESCRIPTION OF THE PREFERRED EMBODIMENTS

A light transmission device using optical fiber according to the present embodiment is described as directed to a multi-beam scanning optical device that scans a plurality of laser fluxes across a predetermined angle producing eight scanning lines per scan on a surface, such as the surface of a photoconductive member.

Figure 1:
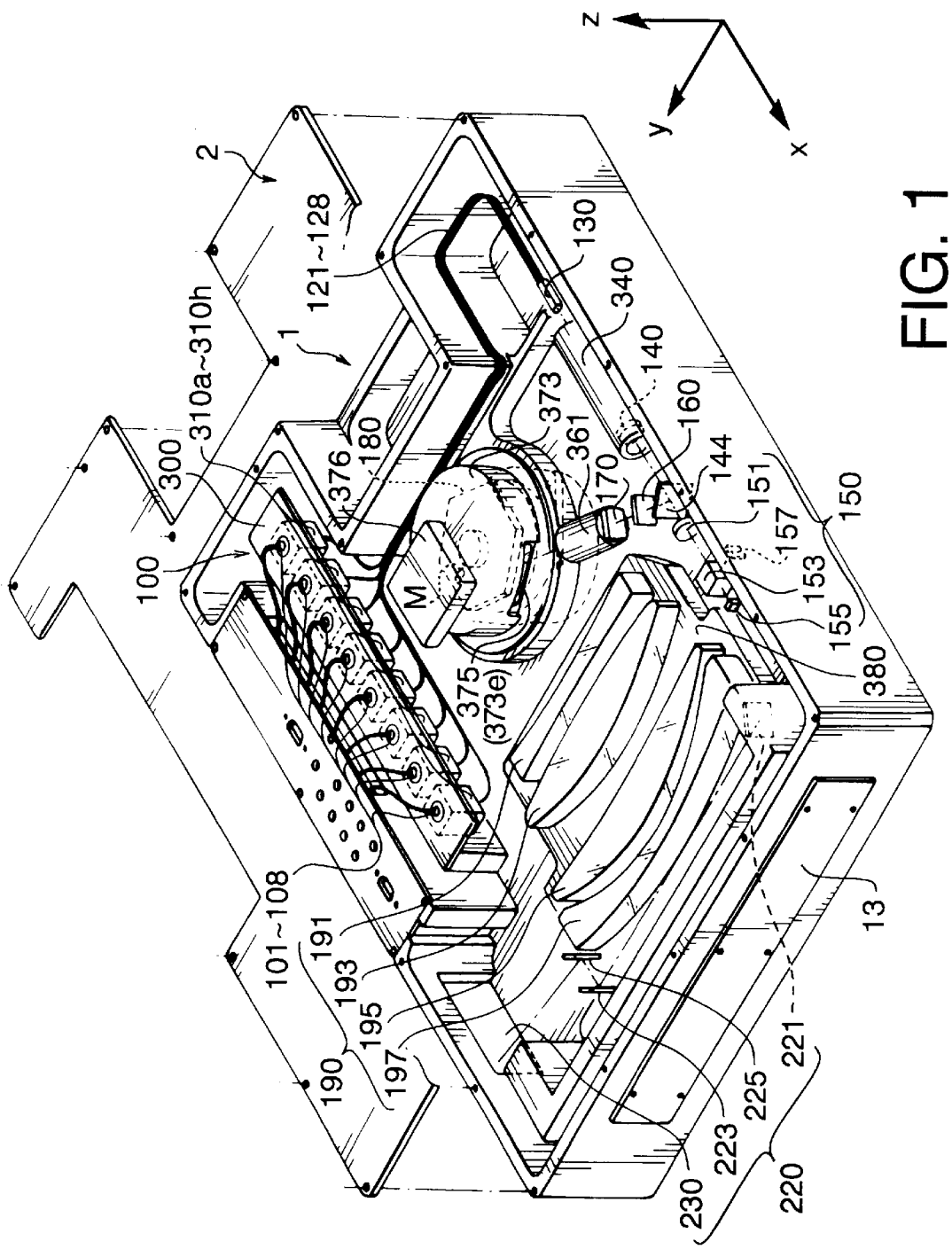
FIG. 1 is a perspective view showing a scanning optical device.
Figure 2:
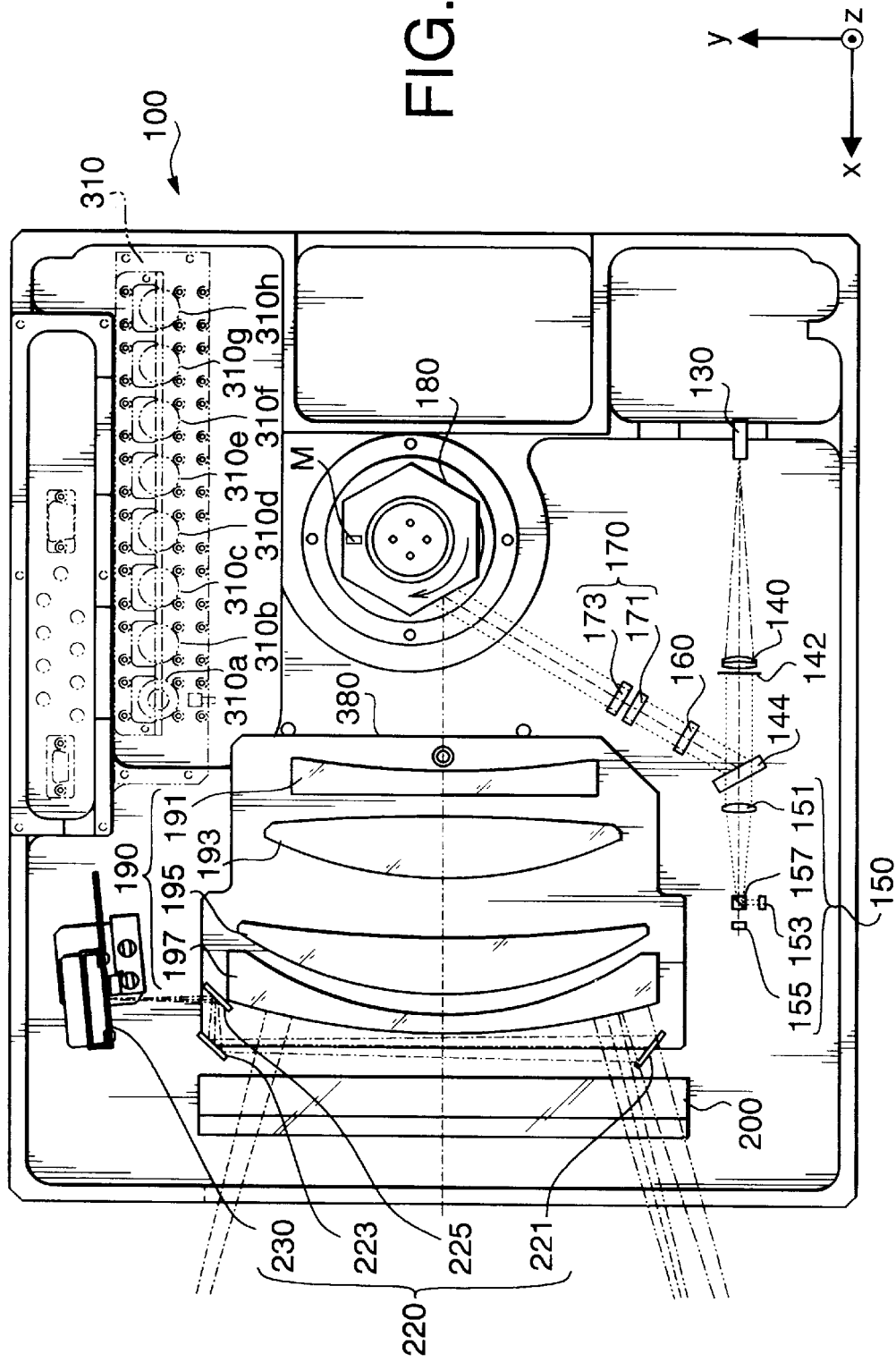
FIG. 2 is a plan view of the scanning optical device shown in FIG. 1 in a main scanning direction.

The structure of the scanning optical device is first described with reference to FIGS. 1 to 4. FIG. 1 shows a perspective view of the scanning optical device, FIG. 2 shows a plan view thereof, FIG. 3 shows a cross-sectional view thereof, and FIG. 4 shows an optical configuration of the scanning optical device.

Figure 3:
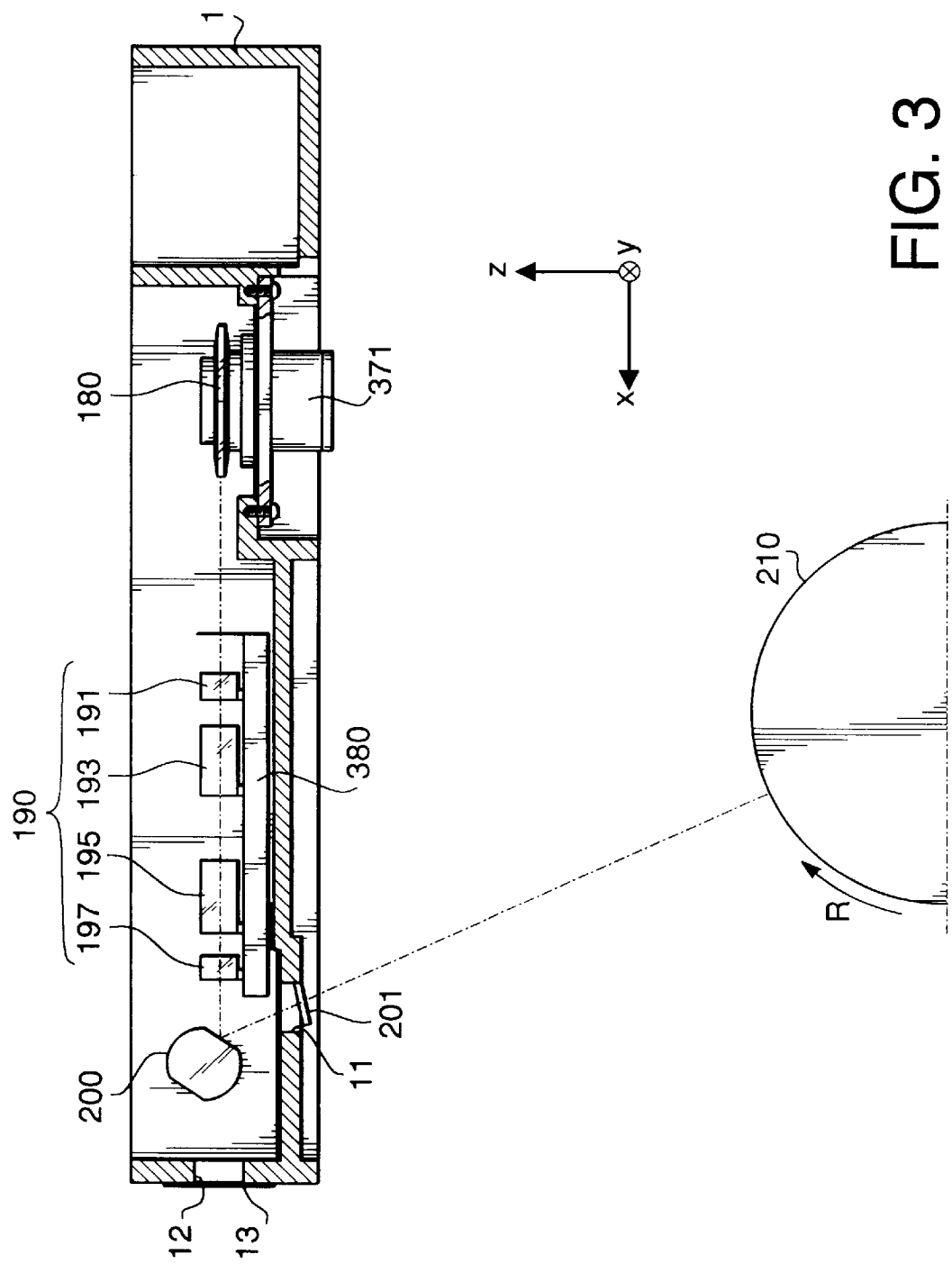
FIG. 3 is a cross-sectional view of the scanning optical device shown in FIG. 1 in the auxiliary scanning direction.
Figure 4:
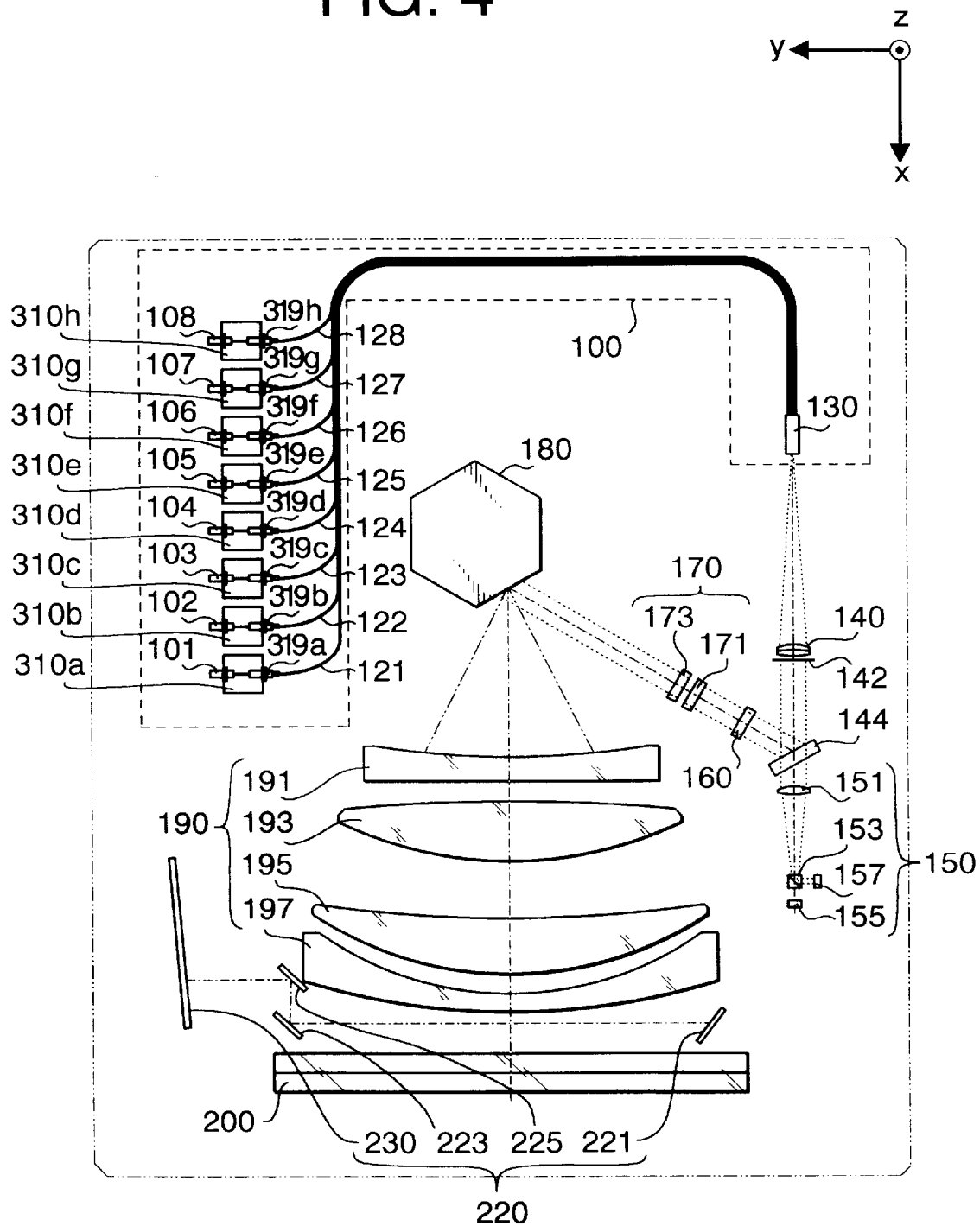
FIG. 4 shows the optical configuration of the scanning optical device of FIG. 1 in the main scanning direction.

As shown in FIGS. 3 and 4, the scanning optical device comprises a light transmission device 100, a polygon mirror 180, and an fθ lens 190 (scanning lens). In operation, eight laser fluxes are emitted from the light transmission device 100, deflected (scanned) by the polygon mirror 180, pass through the fθ lens 190, to form eight scanning lines on a photoconductive surface, such as a photoconductive drum 210.

Throughout this specification, a "main scanning direction" is defined as a direction in which a laser flux scans across the surface of a photoconductive member, and an "auxiliary scanning direction" is a direction in which the photoconductive member is translated or rotated to position the member for a subsequent main scan. The main scanning and auxiliary scanning directions are perpendicular to one another, and are both perpendicular to the optical axes of lenses guiding the laser fluxes. Since a laser flux typically is reflected or "folded" several times in the transmission from the light source to a photoconductive member, the main scanning and auxiliary scanning directions are not absolute, but are generally referred to with reference to the optical axis at a particular point along the optical path.

In this specification, an XYZ coordinate system is defined in each of FIGS. 1 through 4. The X axis is an axis parallel to the optical axis of the fθ lens 190, and the Y and Z axes are orthogonal to each other in the plane perpendicular to the X axis. The Y axis is parallel with the main scanning direction, and the Z axis is parallel with the auxiliary scanning direction.

As shown in FIG. 1, the scanning optical device further includes an open casing 1. In use, the top opening of the casing 1 is closed by an upper cover lid 2.

As shown in FIG. 4, the light transmission device 100 includes eight semiconductor lasers 101 through 108; eight laser blocks 310a through 310h (each attached to a supporting substrate 300), corresponding to each of the lasers 101 through 108; eight silica glass optical fibers 121 through 128, also corresponding to each of the lasers 101 through 108; and a fiber alignment block 130. Each of the lasers 101 through 108 is mounted in the corresponding laser block 310a through 310h such that the respective laser fluxes are guided to enter the corresponding optical fibers 121 through 128. Furthermore, the incident end portions of the optical fibers 121 through 128 are retained by fiber supporting members 319a through 319h fixed at the laser blocks 310a through 310h, respectively. The fiber alignment block 130 secures the exit end portions of the optical fibers 121 through 128 for aligning the eight optical fibers 121 through 128 such that eight point light sources are formed in a straight line.

A diverging light flux emitted from the fiber alignment block 130 is collimated by a collimator lens 140 held by a cylindrical collimator lens barrel 340, and is directed through an aperture 142. The aperture 142 defines a rectangular opening, longer in the main scanning direction, designed to regulate the beam shape (in the main scanning and auxiliary scanning directions) of the light flux emitted from the collimate lens 140.

The light flux that passes through the aperture 142 is directed to a beam splitter 144. The beam splitter 144 splits the light flux causing a part of the light flux to be transmitted as a monitor light flux and the remaining part to be reflected as a main light flux. The transmissivity of the beam splitter 144 (i.e., the amount of light transmitted as a monitor flux) is, for example, from 5 to 10 percent as a mean value of S polarized light and P polarized light.

The monitor light flux is directed into an automatic power control (APC) sensor system 150. The APC sensor system 150 includes a collective lens 151 for converging the monitor flux; a polarization beam splitter 153 which splits the light flux into two linear polarization components that are orthogonal to each other; a first APC light receiving element 155; and a second APC light receiving element 157.

The first and second APC light receiving elements 155 and 157 detect the light energy of the respective linear polarization components, and the output of the light receiving elements 155 and 157 is used for a feedback control of the output of the semiconductor lasers 101 through 108.

The main light flux reflected by the beam splitter 144 is transmitted through a dynamic prism 160. The dynamic prism 160 is rotatably disposed about an axis orthogonal to the optical axis to control the spot position in the auxiliary scanning direction on the image plane. That is, the dynamic prism 160 is preferably a wedge prism, supported to be rotatable about the main scanning direction in order to deviate the direction of the flux in the auxiliary scanning direction. The dynamic prism 160 corrects changes in the position of image spots (in the auxiliary scanning direction) on the scanning plane resulting from either or both of tilting error of the reflecting surfaces of the polygon mirror 180 and unevenness of rotation of a photoconductive drum 210 (shown in FIG. 3, and described later).

The main light flux transmitted through the dynamic prism 160 forms a linear image in the vicinity of the mirror surface of the polygonal mirror 180 by means of a cylindrical lens 170. The cylindrical lens 170 has positive power only in the auxiliary scanning direction. As shown in FIG. 1 and 2, the cylindrical lens 170 is supported by a cylindrical lens barrel 361 and is composed of two lenses 171, 173 having positive and negative power, respectively, in the auxiliary scanning direction.

As shown in FIG. 3, the polygonal mirror 180 is driven by a mirror motor 371 (fixed in the casing 1), and rotates clockwise from the viewpoint of FIG. 2 (shown by an arrow). Furthermore, as shown in FIG. 1, the polygonal mirror 180 is isolated from the atmosphere by a cup-like polygon cover 373 in order to prevent the generation of sound due to rotations, and to avoid damage to the mirror surface from collisions with dust or debris in the air.

An optical path opening 373e is formed at the side of the polygon cover 373, and a cover glass 375 is fitted in the optical path opening 373e. The main flux transmitted through the cylindrical lens 170 enters the polygon cover 373 through the cover glass 375, is deflected by the polygonal mirror 180, and is directed outward, passing again through the cover glass 375. Furthermore, a mark M is attached to or marked on the top surface of the polygonal mirror 180 and a sensor block 376 containing a sensor for detecting the mark M is provided on the top surface of the polygon cover 373.

A polygonal mirror may have facial errors (shape errors) on the reflection surfaces that are produced during manufacturing. This manufacturing error is often uneven between the respective reflection surfaces (i.e. between and among each side of the polygonal mirror). In order to compensate for these facial errors, the error quantity of each surface of the polygonal mirror 180 can be measured and stored in a memory (not shown) during the manufacture of the scanning optical device. Then, by distinguishing which reflection surface of the polygonal mirror 180 is currently being used for scanning, for example, according to the output of the sensor in the sensor block 376, at least the beam position and beam intensity may be corrected according to the error quantity inherent to each of the reflection surfaces of the polygonal mirror 180.

As shown in FIG. 3, the main flux reflected by the polygonal mirror 180 passes through the fθ lens 190 (an image forming optical system) and is reflected by a fold-over mirror 200 to the photoconductive drum 210, forming eight beam spots. The beam spots scan according to rotations of the polygonal mirror 180, forming eight scanning lines per scan on the photoconductive drum 210. The photoconductive drum 210 is driven and rotated in the direction of the arrow R in synchronization with the scanning of the beam spots, to form an electrostatic latent image on the photoconductive drum 210. The latent image is then transferred onto a sheet of paper (not shown) by a known electronic photography process.

The fθ lens 190 includes first, second, third and fourth lenses 191, 193, 195, 197 arranged in order from the polygonal mirror 180 side to the fold-over mirror 200 side, having negative, positive, positive and negative power in both the main scanning and auxiliary scanning directions, respectively. The first, second, third and fourth lenses 191, 193, 195, 197 are arranged on a lens base 380. The combination of first, second, third and fourth lenses 191, 193, 195, 197 in the fθ lens 190 operates such that the light flux that was linearly formed as an image in the auxiliary scanning direction at the polygonal mirror 180 is elliptically formed as an image on the photoconductive drum 210.

The first lens 191 of the fθ lens 190 is a negative lens having a concave spherical surface on the polygonal mirror 180 side, and a cylindrical surface having negative power only in the auxiliary scanning direction on the fold-over mirror 200 side. The surfaces of the lens are designed such that the first lens 191 has a comparatively large negative (i.e. more negative) power in the auxiliary scanning direction and a comparatively small negative power in the main scanning direction.

The second lens 193 of the fθ lens 190 is a meniscus-shaped toric lens having a convex-spherical surface on the polygonal mirror 480 side and a convex toric surface on the fold-over mirror 200 side. The surfaces of the lens are designed such that the second lens 193 has a comparatively large positive (i.e. more positive) power in the auxiliary scanning direction and a comparatively small positive power in the main scanning direction.

The third lens 195 is a positive meniscus lens having two spherical surfaces.

The fourth lens 197 is a negative meniscus lens having two spherical surfaces.

The main flux transmitted through the fθ lens 190 is detected by a synchronization sensor system 220 at each scan (i.e. for each surface of the polygonal mirror 180). The synchronization sensor system 220 is positioned in the optical path between the fourth lens 197 of the fθ lens 190 and the fold-over mirror 200. The synchronization sensor system 220 includes first, second, and third mirrors 221, 223, 225, and a synchronization light sensor 230 which receives the light fluxes reflected by the mirrors 221, 223, 225. The first mirror 221 is positioned in the optical path from the polygonal mirror 180 to the fold-over mirror 200 at one edge of the main scanning range, but outside of a predetermined image forming range (not shown). The second and third mirrors 223 and 225 are positioned outside of the optical path on an opposite side to the first mirror 221. The synchronization light sensor 230 is disposed at a position optically equivalent to the position on the surface of the photoconductive drum 210 at which scanning occurs. Thus, in each main scan, the eight fluxes are sequentially reflected by the first, second, and third mirrors 221, 223, 225 and strike the synchronization light sensor 230. A signal or signals output by the synchronization light sensor 230 are then used to synchronize the transfer of image data equivalent to one scan from a drive circuit (not shown) to drive the semiconductor lasers 101 through 108 according to the image data.

An image forming opening 11, which permits the main flux (including the eight individual fluxes) reflected by the fold-over mirror 200 to be transmitted to the photoconductive drum 210, is formed in the casing 1. A cover glass 201 is attached to the image forming opening 11.

An inspection opening 12 is formed behind the fold-over mirror 200. The inspection opening 12 is used when adjusting optical elements after the optical elements (excluding the fold-over mirror 200) are assembled. As shown in FIG. 3, the inspection opening 12 is covered by a cover plate 13 in normal use.

The scanning optical system is now explained in more detail with reference to FIGS. 5 through 10.

Figure 5:
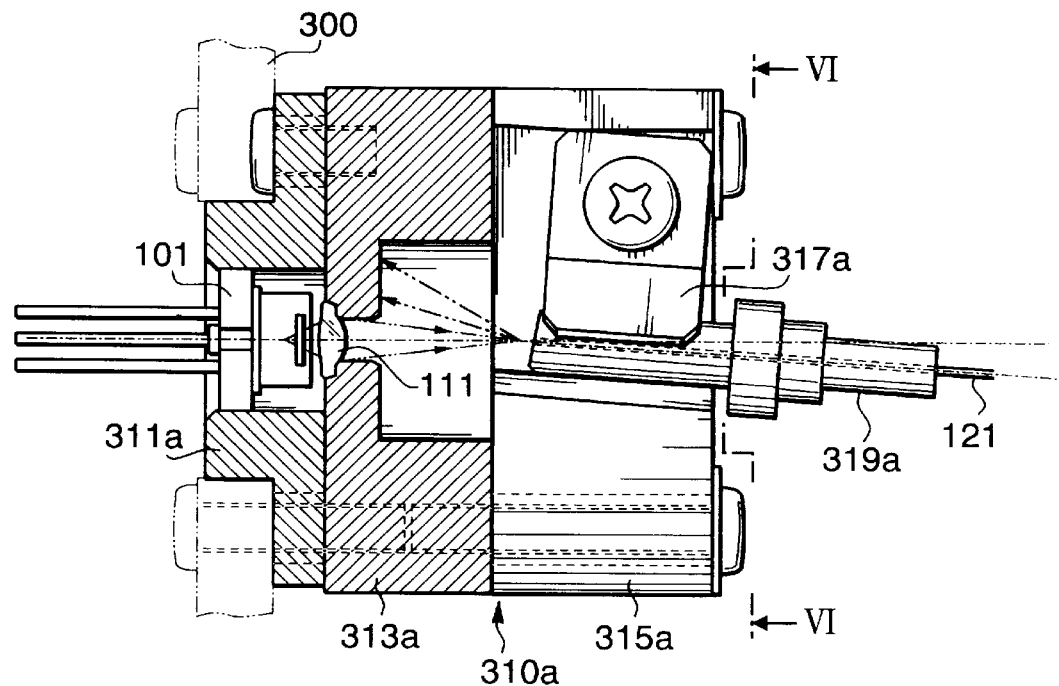
FIG. 5 is a cross-sectional view showing details of a laser block.
Figure 6:
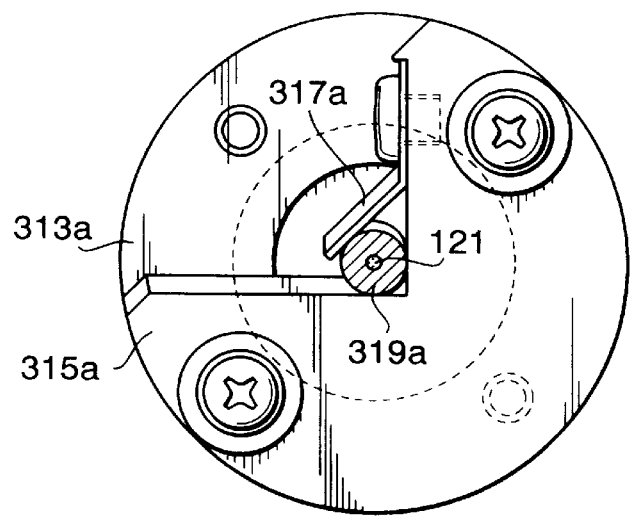
FIG. 6 is a front view taken along line VI—VI in FIG. 5.

FIG. 5 is a cross-sectional view showing a detailed construction of the laser block 310a, and FIG. 6 is a front sectional view of the laser block shown in FIG. 5, taken along the lines VI—VI in FIG. 5. All of the laser blocks 310a to 310h have the same construction, and a description is given of only the laser block 310a as a representative example. The laser block 310a includes a semiconductor laser retaining member 311a for retaining the semiconductor laser 101; a coupling lens retaining member 313a for retaining the coupling lens 111; and a fiber fixing member 315a for holding a fiber supporting member 319a. As shown in FIG. 6, the semiconductor laser retaining member 311a and coupling lens retaining member 313a are substantially cylindrical, and the fiber fixing member 315a is formed as a cylinder having substantially one quarter of the cylinder cut away (viewing along the axial direction), forming surfaces consisting of two walls that are orthogonal to each other.

The semiconductor laser retaining member 311a and the fiber fixing member 315a are fixed in position by screws, on opposite sides of the coupling lens retaining member 313a. The semiconductor laser retaining member 311a is also screwed to the supporting substrate 300. Accordingly, the three members 311a, 313a, and 315a are fixed at the supporting substrate 300 as an integral block. Furthermore, the fiber supporting member 319a is fixed in the corner created by the cut-away wall surfaces of the fiber fixing member 315a by a fixing metal fitting 317a.

The divergent light flux emitted from the semiconductor laser 101 is converged by the coupling lens 111 and directed into the optical fiber 121. The optical fiber 121 is inserted into a through hole formed along the center axis of the fiber supporting member 319a, and is fixed to the supporting member 319a with an adhesive agent.

Preferably, as shown in FIG. 5, the incident end surface of the optical fiber 121 is cut at an angle with respect to the incident optical axis (e.g., an emission axis of the semiconductor laser 101 and/or coupling lens 111) so that the incident end surface is not orthogonal to the incident optical axis. Furthermore, the fiber supporting member 319a itself (i.e., the center axis thereof) is inclined with respect to the incident optical axis so that a light flux refracted at the incident end surface is directed to be parallel with the center axis (e.g., a center axis of the optical fiber 121) of the optical fiber 121.

As shown in FIG. 5, since the incident end surface of the optical fiber 121 is inclined such that it is not orthogonal to the optical axis of the coupling lens 111, the reflected light flux at the incident end surface is directed away from the incident direction, that is, away from the semiconductor laser 101. If the reflected light flux returns to the semiconductor laser 101, the oscillation of the semiconductor will be unstable and the oscillation mode can change from a mono mode to a multi-mode, such that the width of the oscillation wavelength can widen. Thus, the return of light to the semiconductor laser 101 could result in a variation in the desired diameter of the beam spot, due to a longitudinal chromatic aberration of the fθ lens 190, and a variation in the length of the scanning lines due to a lateral chromatic aberration of the fθ lens 190. These variations reduce the image forming accuracy and resolution. Using the described construction to prevent the return of any of the laser flux to the semiconductor laser 101, the semiconductor laser 101 is made more stable in the wavelength emitted.

Figure 7:
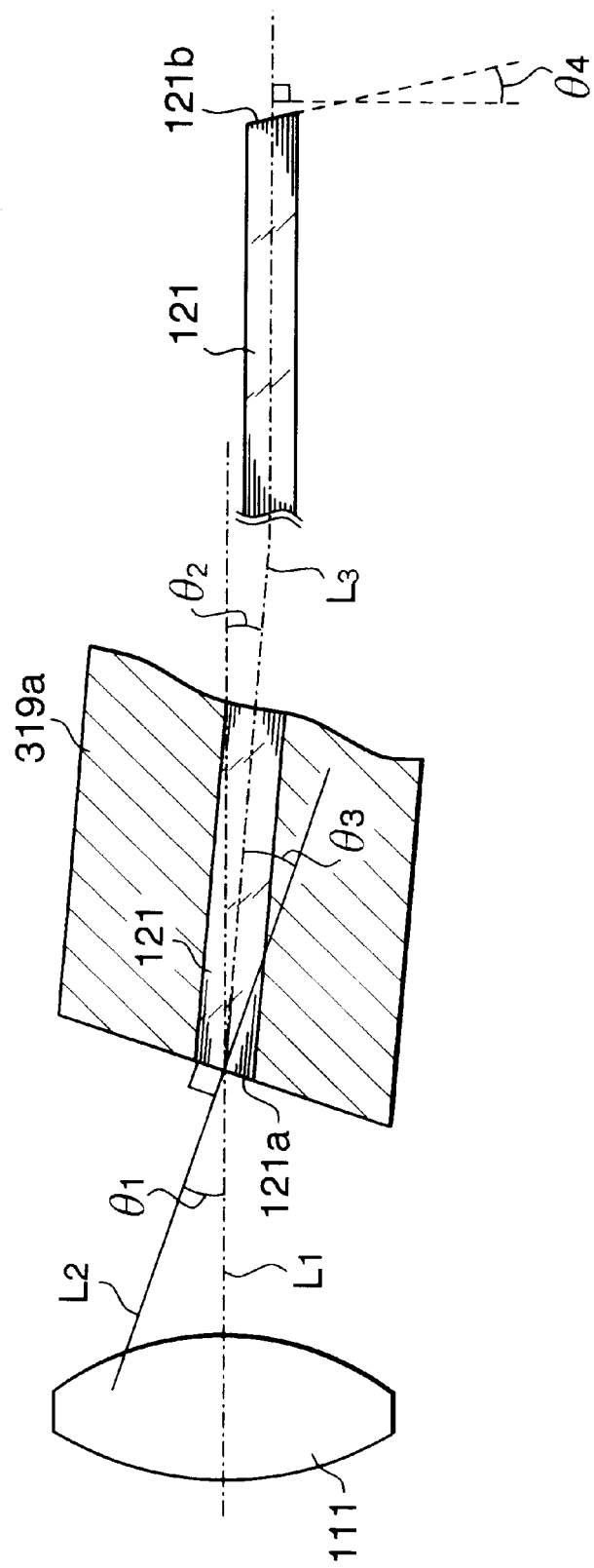
FIG. 7 is a schematic showing the relationship between the incident direction of light fluxes in the laser block and the angle at an incident end surface of optical fibers.

As shown in more detail in FIG. 7 θ1 is an incident angle formed by the optical axis L1 of the coupling lens 111 and a normal L2 of the incident end surface 121a of the optical fiber 121, θ2 is an angle formed by the optical axis L1 of the coupling lens 111 and the center axis L3 of the optical fiber 121, and, further, θ3 is a refracting angle formed by the center axis L3 of the optical fiber 121 and the normal L2 of the incident end surface 121a. Further, n is defined as the core refraction index of the optical fiber 121. If the angle θ1 is predetermined, then the remaining angles θ2 and θ3 are defined according to two expressions:

$$\theta 3 = \sin^{-1}(\sin\theta 1)/n \quad (1); \text{ and}$$

$$\theta 2 = \theta 1 - \theta 3 \quad (2).$$

The incident end surface 121a of the optical fiber 121 is preferably polished integrally as attached to the fiber supporting member 319a. Accordingly, the incident end surface 121a of the fiber 121 is made flush with the end surface of the incident side of the fiber supporting member 319a, and the surfaces are polished together.

Furthermore, the exit end surface 121b of the optical fiber 121 is diagonally cut at an angle θ4 to a plane that is orthogonal to the center axis L3 of the optical fiber 121. With this construction, even though a portion of the light flux is internally reflected from the exit end surface 121b of the optical fiber 121, the reflected light does not satisfy the conditions for total reflection, is not fully transmitted within the optical fiber 121, and is thus attenuated before returning to the semiconductor laser 101 side. Thus, again, no returning light is sent to the semiconductor laser 101, and the light emission mode of the semiconductor laser 101 remains stable.

Figure 8:
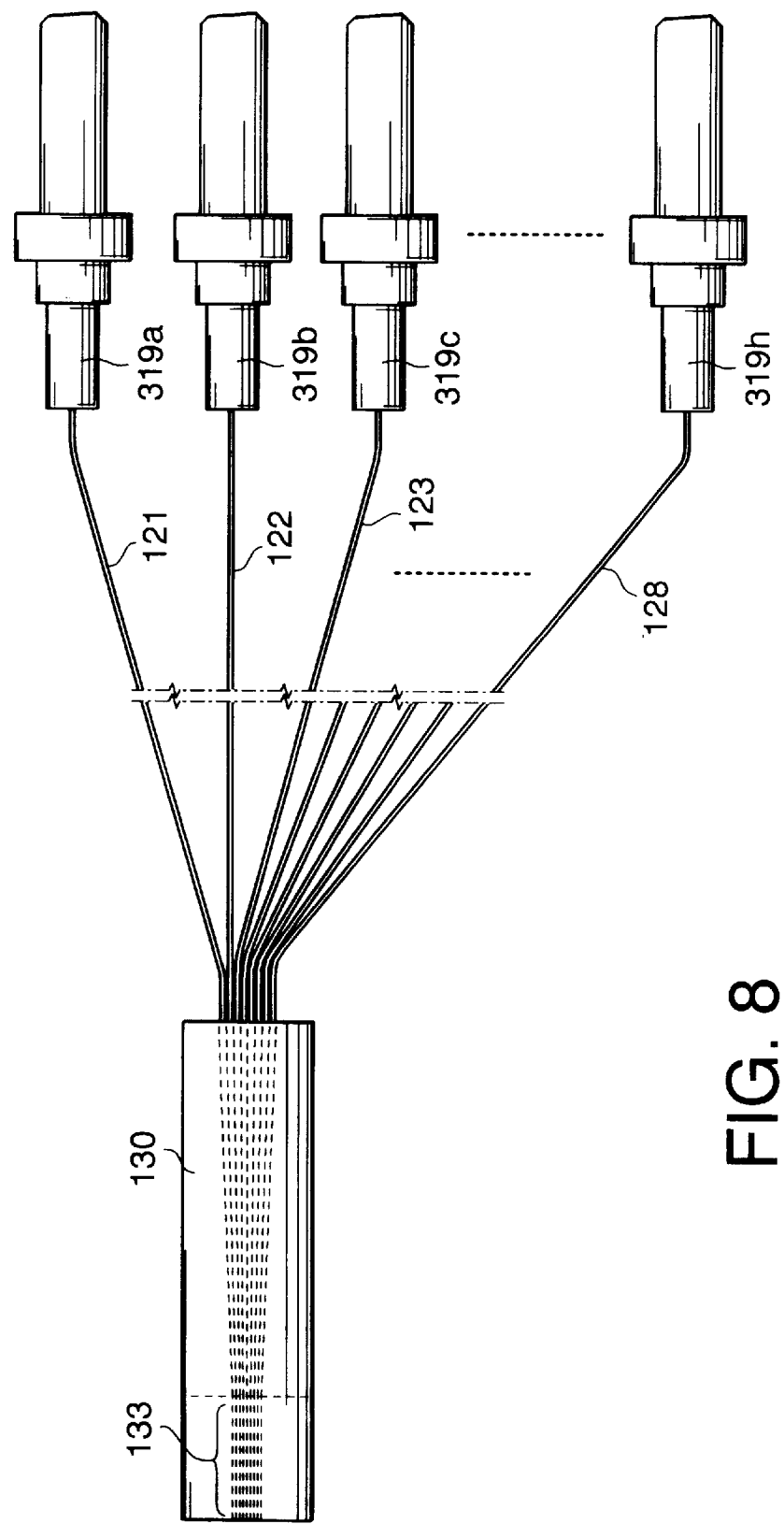
FIG. 8 is a plan view showing the elements from a fiber supporting member to a fiber alignment block.
Figure 9:
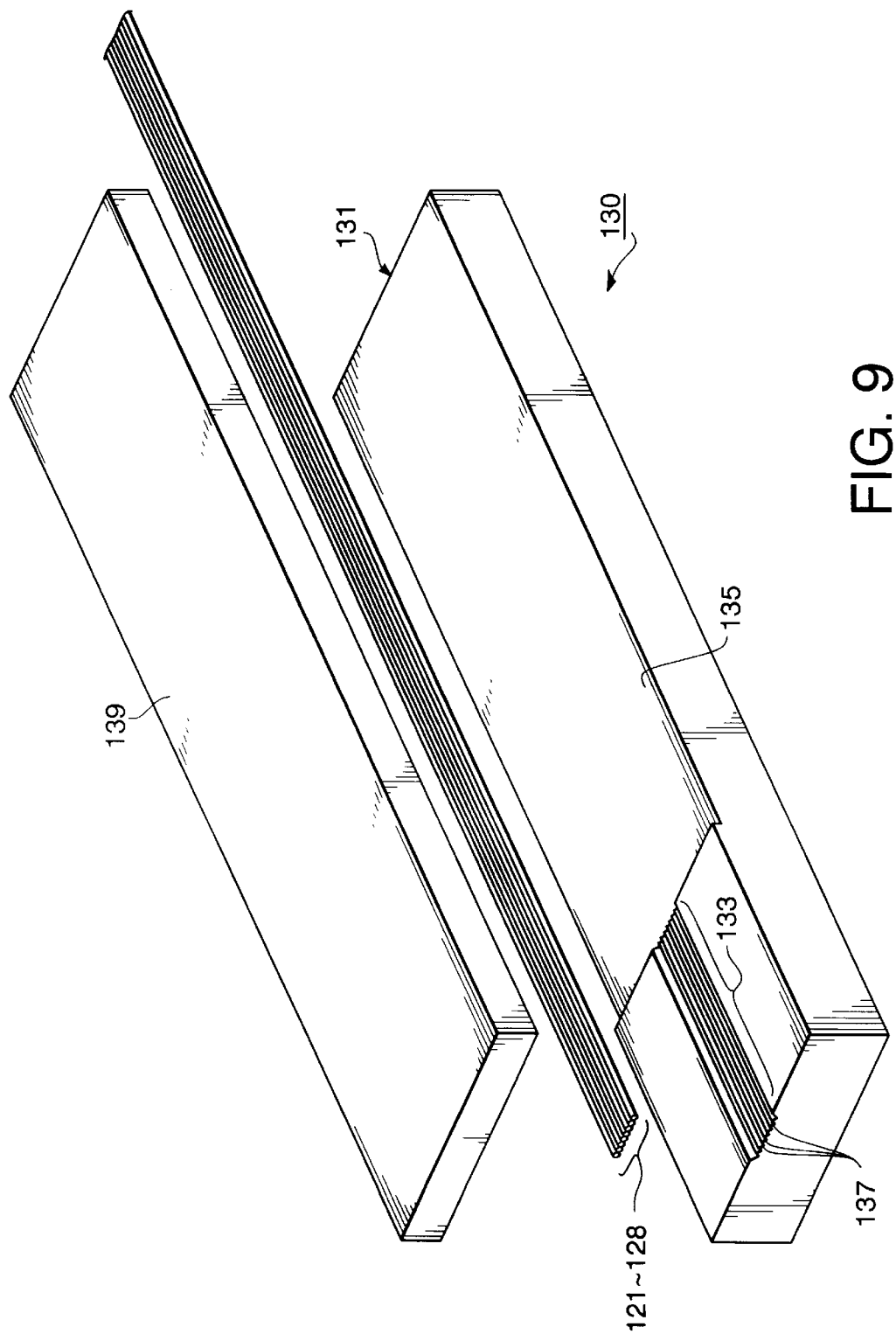
FIG. 9 is an exploded view of a fiber alignment block.

The exit end portions of the optical fibers 121 through 128 are aligned by a fiber alignment block 130 as shown in FIG. 8. The center axes of the respective optical fibers 121 through 128 are positioned in a straight row. FIG. 9 is an exploded view of the fiber alignment block 130. As shown in FIG. 9, an alignment portion 133 to position the exit end portions of the optical fibers 121 through 128 is formed in a body 131, and a pressing plate 139 presses the optical fibers 121 through 128 to the body 131. An introduction portion 135 is formed at the block entry side from the alignment portion 133 of the body 131 to provide a staging gap entering between the pressing plate 139 and the body 131.

Figure 10:
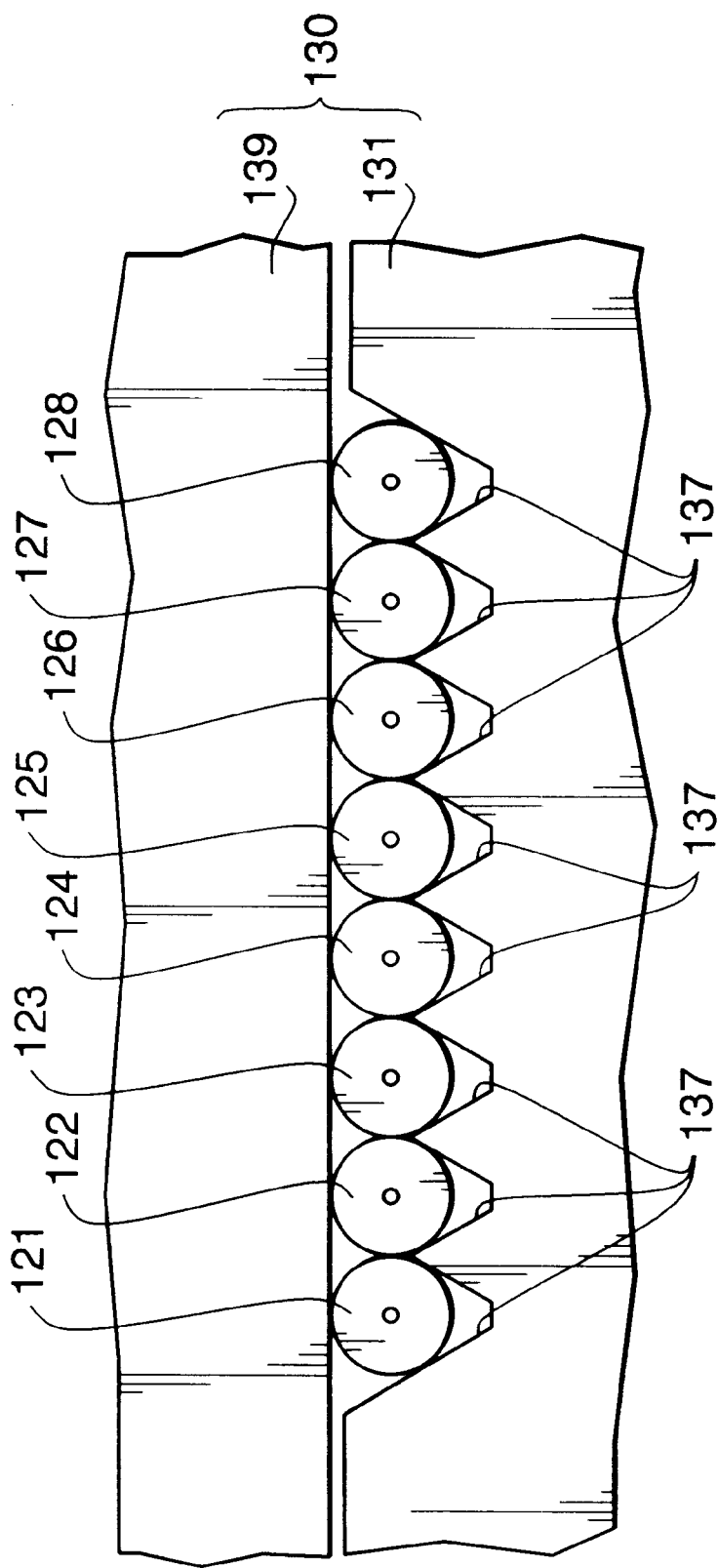
FIG. 10 is an enlarged front view of the fiber alignment block.

As shown in FIGS. 9 and 10 eight parallel V-shaped grooves 137 corresponding to the optical fibers 121 through 128 respectively are formed at the alignment portion 133. The depth of each of the V-shaped grooves 137 is such that each of the optical fibers 121 through 128 protrude slightly above the alignment portion 133 and can be pressed by the pressing plate 139.

Preferably, the body 131 of the fiber alignment block 130 is made of a substance having a hardness that is lower than that of the optical fibers 121 through 128, for example, plastic, and the pressing plate 139 is made of a substance having a hardness that is higher than that of the body 131, for example, glass. During assembly, each of the fibers 121 to 128 are set in the respective grooves 137, an adhesive is added, and the fibers are then tightly pressed by the pressing plate 139. In this process, the fibers 121 to 128 are pressed into the grooves 137 and the grooves 137 deform as necessary to form around the fibers 121 to 128. The optical fibers 121 through 128 and the fiber alignment block 130 are thus integrally fixed by the adhesive between the body 131 and the pressing plate 139. In this way, the pressing plate 139 can be formed having a flat surface that becomes a reference plane against which the optical fibers are pressed. Since it is easier to manufacture a high-tolerance flat surface than high-tolerance grooves, the use of the harder pressing plate 139 and the softer grooves 137 and body 131 allows the accuracy of the V-shaped grooves 137 to have a wider range of design parameters (allowance) while maintaining the accuracy of the alignment of the optical fibers 121 to 128.

Figure 11:
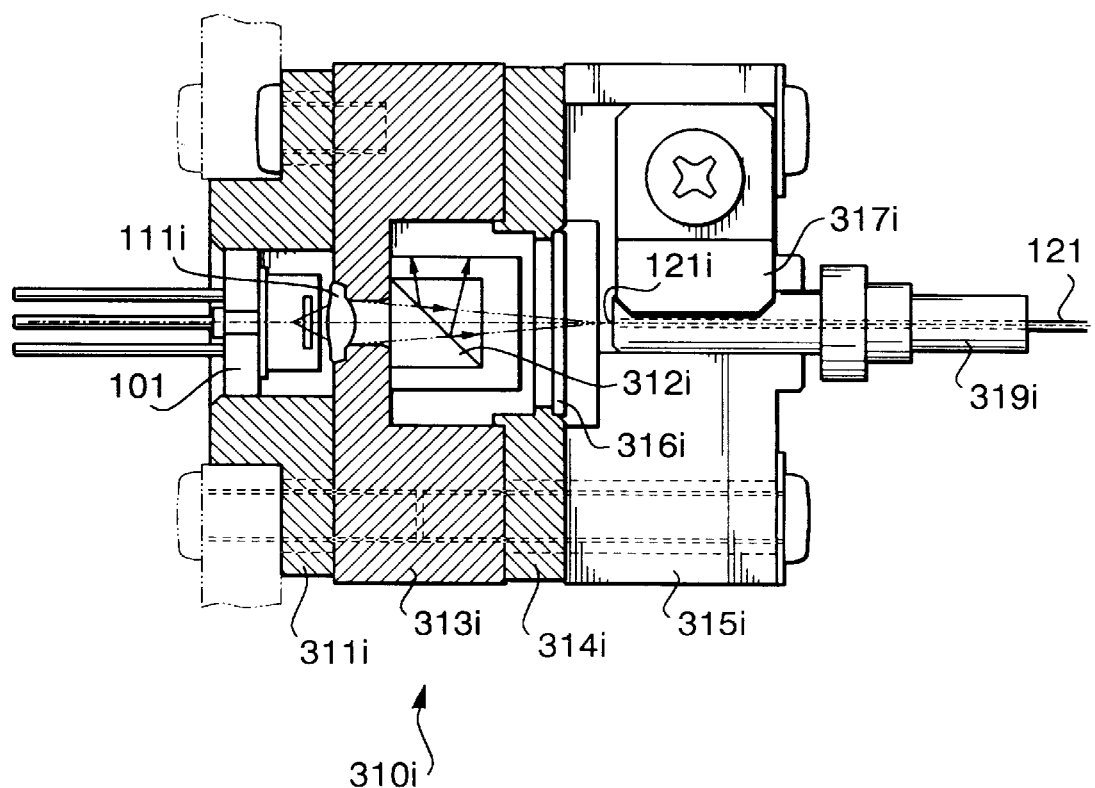
FIG. 11 is a cross-sectional view showing a second embodiment of a laser block.

FIG. 11 is a cross-sectional view, similar to FIG. 5, showing a laser block 310i of another embodiment of the light transmission device. In this embodiment, elements that are the same as those described with reference to FIG. 5 are not described. In general, the laser blocks 310a through 310h of the first embodiment are replaced with laser blocks identical to the laser block 310i in the present embodiment. In this embodiment, an optical isolator is used for preventing reflected light from returning to the semiconductor lasers, as described below. The optical isolator includes a polarization beam splitter 312I and a quarter-wave plate 316i.

The laser block 310i includes a semiconductor laser retaining member 311i for retaining a semiconductor laser 101; a coupling lens retaining member 313i for retaining a coupling lens 111i; a quarter-wave plate retaining portion 314i; and a fiber fixing member 315i for holding a fiber supporting member 319i. The semiconductor laser retaining member 311i, the coupling lens retaining member 313i, and the quarter-wave plate retaining portion 314i are substantially cylindrical, and the fiber fixing member 315i is formed as a cylinder having substantially one quarter of the cylinder cut away (viewing along the axial direction), forming surfaces consisting of two walls that are orthogonal to each other.

The semiconductor laser retaining member 311i and a combination of the quarter-wave plate retaining portion 314i and the fiber fixing member 315i are fixed in position by screws, on opposite sides of the coupling lens retaining member 313i. The semiconductor laser retaining member 311i is also screwed to the supporting substrate 300. Accordingly, the semiconductor laser retaining member 311i, the coupling lens retaining member 313i, the quarter-wave plate retaining portion 314i, and the fiber fixing member 315i are fixed at the supporting substrate 300 as an integral block. Furthermore, the fiber supporting member 319i is fixed in the corner created by the cut-away wall surfaces of the fiber fixing member 315i by a fixing metal fitting 317i.

The coupling lens retaining member 313i is provided with a coupling lens 111i and a polarization beam splitter 312i. The quarter-wave plate retaining portion 314i is provided with a quarter-wave plate 316i.

The coupling lens 111i converges the light flux emitted from the semiconductor laser 101, and the polarization beam splitter 312i and the quarter-wave plate 316i operate as an optical isolator for which the advancing direction of the light flux emitted from the semiconductor laser 101 is defined as a forward direction. In this embodiment, the optical axis of the coupling lens 111i is coincident with the center axis of the optical fiber 121 and the incident end surface 121i of the optical fiber 121 is perpendicular to the optical axis.

According to the construction in FIG. 11, the linear polarized light flux emitted from the semiconductor laser 101 which passes through the polarization beam splitter 312i are converted to have circular polarization by passing through the quarter-wave plate 316i.

If a part of the light flux is reflected by the incident end surface 121i of the optical fiber 121, the returning light flux also has a circular polarization. However, the vibration (or vibrating) direction of the electric field vector is in a reverse direction. Thus, if a part of the light flux again passes through the quarter-wave plate 316i, the polarization becomes linear polarization, however, the polarization direction is 90 degrees different from that of the incident flux. Therefore, the light flux reflected from the incident end surface 121i is prevented from returning to the semiconductor laser 101 since the light flux is reflected by the polarization beam splitter 312i. In this way, chromatic aberration problems can be prevented from occurring due to changes of the light emission mode of the semiconductor lasers 101 to 108.

Furthermore, if the polarization direction of the laser flux emitted from the semiconductor laser is set as P polarization with respect to the polarization beam splitter 312$i$, it is possible to prevent the returning light from reaching the semiconductor laser 101 without any loss of the light quantity at the polarization beam splitter 312$i$.

As described above, it is possible to prevent the light flux reflected from optical fibers from returning to a semiconductor laser, and in a case where a chromatic aberration exists in the image forming optical system, it is possible to suppress a chromatic aberration problem from occurring due to changes of the light emission mode of a semiconductor laser.

The present disclosure relates to subject matter contained in Japanese Patent Application No. HEI 8-037267, filed on Jan. 31, 1996, which is expressly incorporated herein by reference in its entirety.

What is claimed is:

1. A light transmission device, comprising:
    a semiconductor laser having an emission axis and that emits a laser flux substantially along the emission axis;
    an optical fiber having a center axis and that transmits said laser flux emitted from said semiconductor laser substantially along the center axis; and
    means for preventing said laser flux, reflected at an incident end surface of said optical fiber, from returning to said semiconductor laser, said optical fiber being positioned with the center axis at the incident end surface inclined to the emission axis of the semiconductor laser, and said preventing means including the incident end surface of the optical fiber, facing the semiconductor laser, being oblique to both of the center axis of the optical fiber at the incident end surface and the emission axis of the semiconductor laser, and transmitting said laser flux substantially along said center axis while directing any laser flux not entering said optical fiber away from said semiconductor laser.

2. The light transmission device according to claim 1, wherein said preventing means comprises a slanted incident end surface of said optical fiber such that said laser flux, reflected at said incident end surface, is directed away from said semiconductor laser.

3. The light transmission device according to claim 2, wherein a normal of said incident end surface and a center axis of said laser flux emitted from said semiconductor laser are inclined with respect to each other.

4. The light transmission device according to claim 3, wherein said incident end surface of said optical fiber is arranged so that incident light progressing along said center axis is refracted to progress along a center axis of said optical fiber.

5. The light transmission device according to claim 2, wherein a normal of said incident end surface and a center axis of said optical fiber are inclined with respect to each other.

6. The light transmission device according to claim 5, wherein the incident end surface of said optical fiber is arranged so that the incident light flux progressing along said center axis is refracted to progress along a center axis of said optical fiber.

7. The light transmission device according to claim 1, wherein said preventing means comprises an optical isolator disposed between said semiconductor laser and said incident end surface of said optical fiber.

8. The light transmission device according to claim 1, wherein an exit end surface of said optical fiber is formed as an inclined surface with respect to a center axis of said optical fiber, such that a normal of said exit end surface and said center axis are inclined with respect to each other by a predetermined angle, such that said reflected laser flux at said exit end surface does not satisfy a total reflection condition of said optical fiber.

9. A scanning optical device, comprising:
    a light transmission device that includes a semiconductor laser having an emission axis and that emits a laser flux substantially along the emission axis, and an optical fiber having a center axis and that transmits said laser flux emitted from said semiconductor laser substantially along the center axis and means for preventing said laser flux, reflected at an incident end surface of said optical fiber, from returning to said semiconductor laser,
    said optical fiber being positioned with the center axis at the incident end surface inclined to the emission axis of the semiconductor laser, and said preventing means including the incident end surface of the optical fiber, facing the semiconductor laser, being oblique to both of the center axis and the emission axis, and transmitting said laser flux substantially along said center axis while directing any laser flux not entering said optical fiber away from said semiconductor laser, and;
    a deflector that deflects said laser flux transmitted through said optical fiber; and
    a scanning lens system that converges said deflected laser flux to form a scanning line on an image surface.

10. The scanning optical device according to claim 9, wherein said light transmission device is provided with a plurality of semiconductor lasers, a plurality of optical fibers and a plurality of preventing means.

11. The scanning optical device according to claim 9, wherein said preventing means comprises a slanted incident end surface of said optical fiber, such that reflected laser flux at an incident end surface is directed away from said semiconductor laser.

12. The scanning optical device according to claim 9, wherein said preventing means comprises a slanted exit end surface of said optical fiber, such that reflected laser flux at said exit end surface does not satisfy a total reflection condition of said optical fiber.

13. A scanning optical device, comprising:
    a light transmission device, including a semiconductor laser with an emission axis that emits a laser flux substantially along the emission axis;
    an optical fiber with a center axis that transmits said laser flux emitted from said semiconductor laser substantially along the center axis, said optical fiber having an incident end surface facing said semiconductor laser;
    a coupling lens for concentrating said laser flux between said semiconductor laser and said optical fiber, said concentrated laser flux having a first polarization;
    a polarization beam splitter between said coupling lens and said incident end surface of said optical fiber, said polarization beam splitter including a transmission surface, oblique to said emission axis and to said center axis of said optical fiber at said incident end surface, that passes laser flux of said first polarization and reflects light of a second polarization away from said semiconductor laser;
    a quarter wave plate, positioned between said polarization beam splitter and said incident end surface of said optical fiber, that imparts said second polarization to laser flux passing therethrough, reflected by said incident end surface, and passing again therethrough in an opposite direction, so that any laser flux reflected from said incident end surface and directed toward said semiconductor laser is given said second polarization and directed away from said semiconductor laser by said transmission surface of said polarization beam splitter;

a deflector that deflects said laser flux transmitted through said optical fiber; and a scanning lens system that converges said deflected laser flux to form a scanning line on an image surface.

* * * * *